June 23, 1953  H. H. BATES  2,643,096

TRENCH MAKING MACHINE AND THE LIKE

Filed May 17, 1948  6 Sheets-Sheet 1

Inventor:
Harry H. Bates,

June 23, 1953          H. H. BATES          2,643,096

TRENCH MAKING MACHINE AND THE LIKE

Filed May 17, 1948          6 Sheets-Sheet 2

Inventor:
Harry H. Bates,
by Thos. A. Lamm
Atty.

June 23, 1953 H. H. BATES 2,643,096
TRENCH MAKING MACHINE AND THE LIKE
Filed May 17, 1948 6 Sheets-Sheet 3

Inventor:
Harry H. Bates,
by [signature]
Atty.

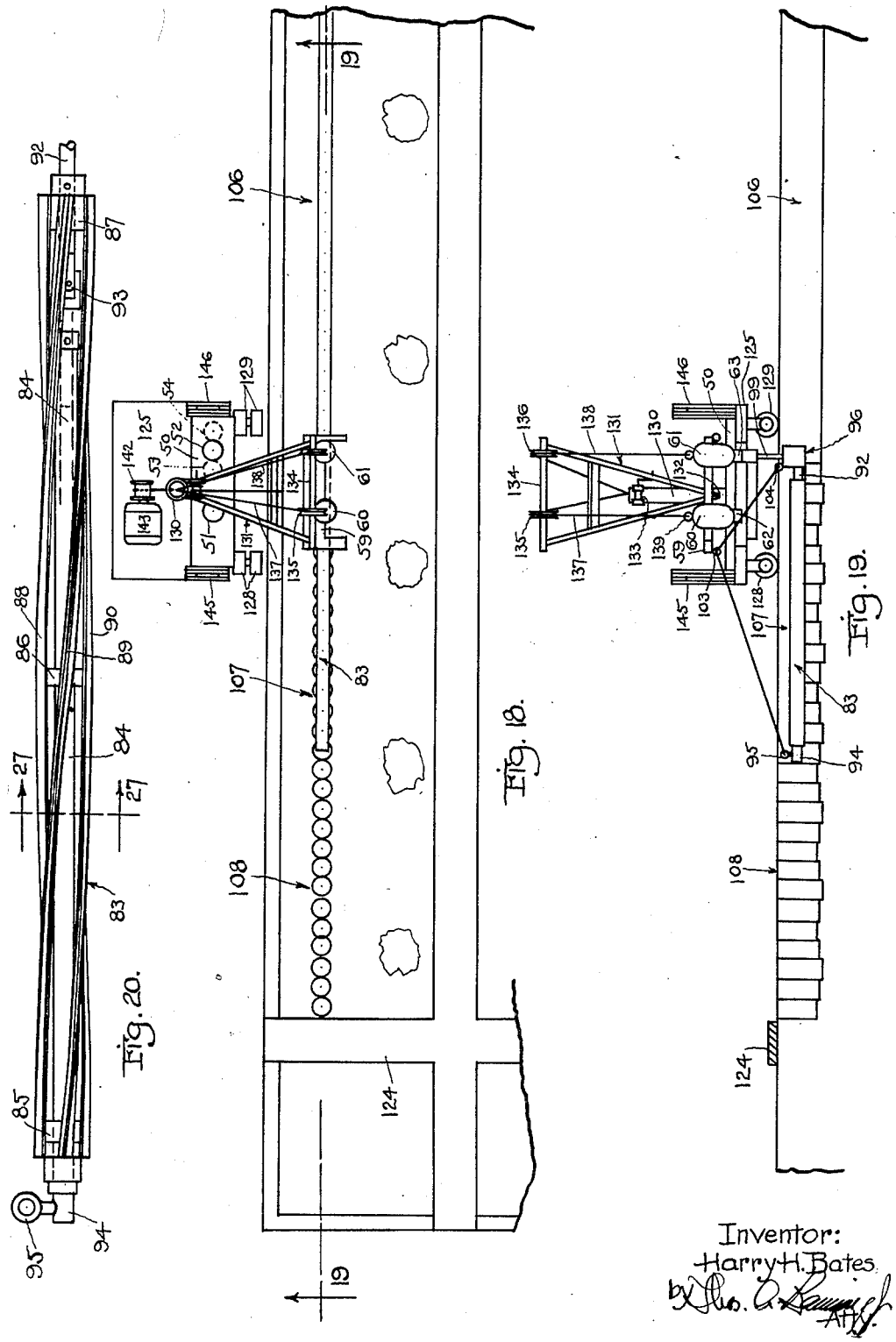

Inventor:
Harry H. Bates,
by

June 23, 1953   H. H. BATES   2,643,096
TRENCH MAKING MACHINE AND THE LIKE
Filed May 17, 1948   6 Sheets-Sheet 6
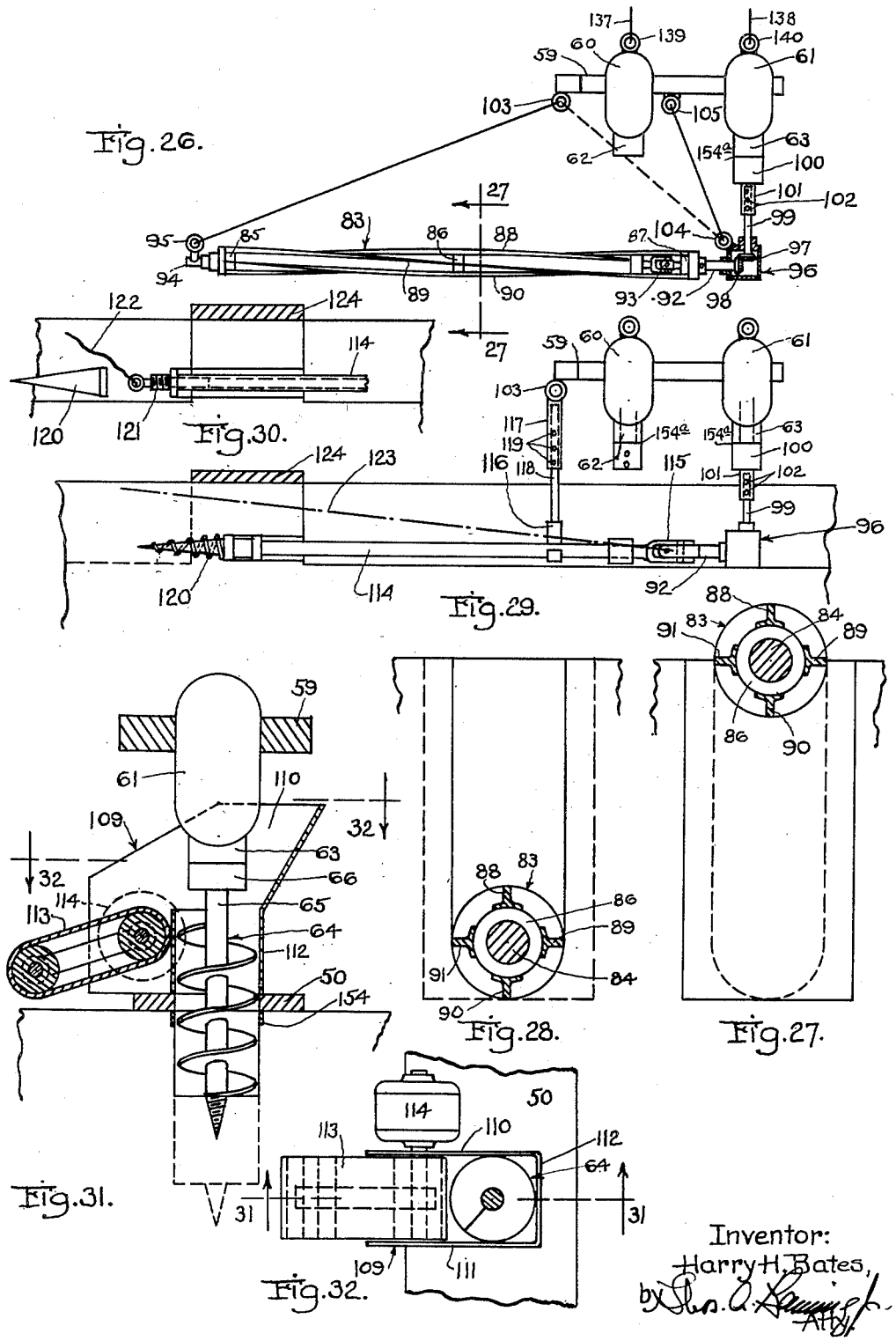
Inventor:
Harry H. Bates, Patented June 23, 1953

2,643,096

UNITED STATES PATENT OFFICE 2,643,096

TRENCH MAKING MACHINE AND THE LIKE

Harry H. Bates, Oregon, Ill.

Application May 17, 1948, Serial No. 27,443

4 Claims. (Cl. 255—19)

This invention relates to improvements in trench making machines, and the like. As will presently appear, the invention also concerns itself with the method or steps of operations whereby the trenching operation is conducted to produce the completed trench in finished condition ready to accommodate the cable or other utility which is to be accommodated within such trench.

I may here mention that my present equipment includes a truck-like unit which is designed and capable of travelling along the pavement adjacent to the curb. This truck carries a derrick mast and a corresponding boom which can be raised into substantially vertical position or may be lowered under control to desired extent in order to cause its free or working end to overlie the adjacent curb to the needed extent. This boom also carries a pair of cables which in turn carry suspended a pair of motors which have vertical shafts and suitable driving connections or elements to which the drills or other units may be drivingly connected. Preferably these two motor units are carried or connected to a common plate or bar so that they are maintained at fixed spacing with respect to each other, and both motors (together with such plate or bar) may be simultaneously raised or lowered, the boom being in a selected position. I have also provided what may be termed a template attached to the truck by a pair of jointed arms, and by chains or cords suspended from the ends of the bar connecting the two motors, so that such template may be moved over to proper location and set down on the ground surface on a continuous straight path parallel to one side of the truck, at a location where operations are to be conducted. This template is provided with holes to pass the two drills at correct spacing, as will be presently explained, so that two of the vertical holes will be drilled simultaneously and at correct spacing. It is here noted that such spacing will necessarily be correct as between these two holes themselves since they are both drilled at the same setting of the template and through proper template holes. However, it must now be seen that not only must these holes be correctly drilled as respects their inter-relationship, but they must bear correct relationship to other and previously drilled holes so that the desired continuity of trench drilling will be maintained, and so that when the miller is subsequently used it can and will operate in proper manner on a trench section which includes numerous holes, not merely these two.

Accordingly I have also provided in conjunction with this template a pair of suitable "plugs." These may extend through the template or may be suspended therefrom at definite locations by means of pins or rods. These plugs are of diameter to fit snugly into previously drilled holes, and to completely fill such holes during a subsequent drilling operation. It is intended that after drilling one pair of holes the truck shall be advanced a distance equal to the diameters of two holes, that the plugs shall then be set down into two of the previously drilled holes, thus fixing the position of the template, and likewise fixing the positions of the two motor driven drills, and that said two motor driven drills shall then be operated to drill two fresh holes at positions thus established. At this point I may mention that the two drills are separated a distance equal to three hole diameters, for reasons which will presently become apparent, and that during the drilling operation one of the new holes so being drilled shall be located between the two plugs, and in a space which was previously not drilled. The drilling of such intermediate hole would generally cause such disturbance of the ground that much of the previously drilled holes would be re-filled, thus destroying their usefulness as portions of the intended trenching operation. However, the plugs which have been inserted into these previously drilled holes serve to fill such holes more or less completely so that no dirt will find its way into such previously drilled holes; thus the plugs serve the dual functions of fixing the positions of the template and the drills for the new drilling operation, and of preventing influx of dirt into the previously drilled holes which are temporarily filled by the plugs.

It is here noted that the connections of the template to the truck are so arranged that movement of such template endwise with respect to the truck is prevented while at the same time allowing for movement of the template laterally with respect to the truck to such location as will permit setting of the template onto the ground surface each time at a location to ensure proper continuity of the trenching operation. Accordingly such template connections are by way of jointed or elbow arms which are so jointed together as to allow for free hinging action while ensuring continued alignment of the arm sections in vertical planar relationship. As a result it is possible to shift the template laterally to correct position for trench alignment and then to lower the template while in such position, such combined movements bringing the template into contact with the ground surface at the proper location. These elbow jointed arms also make it possible to swing the template upwardly and back onto the surface of the truck adjacent to the truck mast. When so positioned on the truck the template may be carried thereby, and also with the template in such truck supported position it is possible to conduct the milling and horizontal drilling operations free of interference from the template.

Other objects and uses of the invention will appear from a detailed description of the same, which consists in the features of construction and combinations of parts hereinafter described and claimed.

Figure 21:
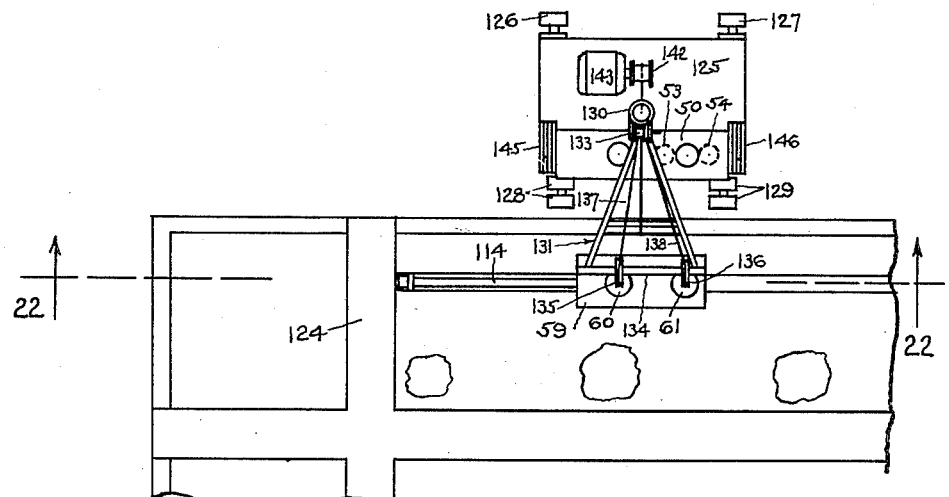
Figure 22:
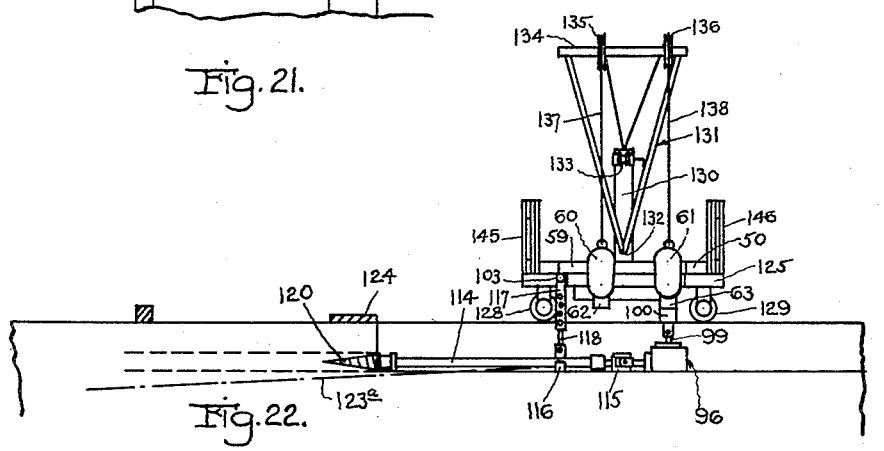
Figure 24:
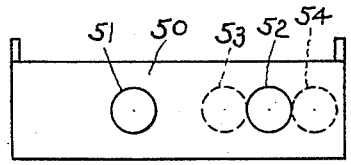
Figure 25:
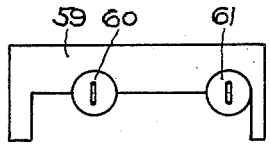
Figure 23:
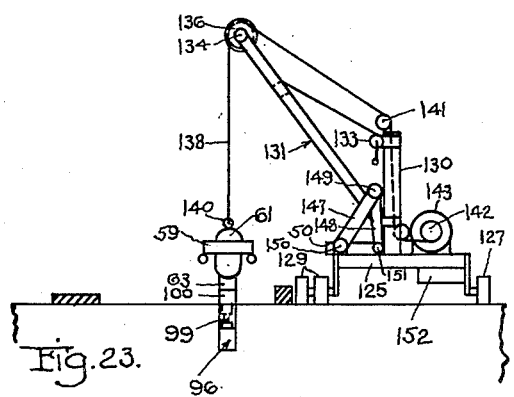

Figure 18 shows more or less schematically a section of trench, together with running walk, cross-walk, curb, and trees, and it shows at the right-hand portion the completed milled trench, in the central portion the truck being used for the milling of a number of previously drilled vertical holes, and in the left-hand portion a group of vertical proximate holes prior to being milled by the subsequent milling operation;

Figure 19 shows a vertical longitudinal section taken on the line 19—19 of Figure 18, looking in the direction of the arrows;

Figure 20 shows, on enlarged scale as compared to Figures 18 and 19, a side view of the miller provided for the milling of the side walls of the vertically drilled holes of a trench section;

Figure 21 shows more or less schematically a section of trench adjacent to an obstruction in the form of a cross-walk, and with the vertical drills removed from the motor elements, and a horizontal drill substituted in place thereof for drilling beneath the cross-walk horizontally;

Figure 22 shows a vertical section taken on the line 22—22 of Figure 21, looking in the direction of the arrows;

Figure 23 shows a right-hand end view corresponding to Figures 21 and 22;

Figure 24 shows on enlarged scale as compared to Figures 5 to 23, inclusive, a plan view of the template element;

Figure 25 shows, also on enlarged scale as compared to Figures 5 to 23, inclusive, a plan view of the motor supporting element;

Figure 26 shows on enlarged scale as compared to Figures 5 to 23, inclusive, the motor carrying plate or bar and motor elements, together with the horizontal miller attached to the right-hand motor element by a right-angle bevel gear unit and with a universal joint connection to permit the miller unit to be set at other than directly right-hand relation to the vertical shaft of the motor element;

Figure 27 shows on enlarged scale as compared to Figure 26 a cross-section taken on the line 27—27 of Figure 26, looking in the direction of the arrows; and with the miller at its top or beginning position preparatory to milling down the serrations of a series of proximate vertical holes; this section being taken at the center of a vertical hole prior to such milling operation, and showing the extreme diameter of such vertical hole by full lines, and showing by dotted lines the ultimate or final width of the milled hole;

Figure 28 shows a view corresponding to Figure 27, but with the miller worked down to its lowermost or finally lowered position; and this figure shows by dotted lines the original extreme diameter of the vertical holes, and by full lines it shows the final or finished width of the trench;

Figure 29 shows a view similar to that of Figure 26, but with the horizontal drill in place instead of the horizontal miller; and it shows the drill bit working through the dirt beneath a cross-walk; and it shows by broken lines how the horizontal drill can be tilted either up or down to meet local conditions;

Figure 30 shows the bit end of the horizontal drill, with the bit disconnected from the shank of such horizontal drill, and with a rope receiving fixture substituted in place of the end bit so as to enable said rope to be drawn back through the horizontally drilled hole beneath the cross-walk;

Figure 31 shows on enlarged scale as compared to Figures 5 to 23, inclusive, the motor element and vertical drill, and with the dirt chute in place around the upper delivery end of the vertical drill, and the horizontal conveyor for conveying raised dirt away from the drill to discharge the same in the form of a ridge adjacent to the series of vertically drilled holes; and Figure 32 shows a horizontal plan view corresponding to Figure 31.

Referring first to Figures 1 to 4, inclusive, if a vertical hole, 40, of diameter of, say, twelve inches, be drilled into the ground to a depth substantially equal to the depth of the intended trench, this hole will have a cross-sectional area of 0.7854 times the square of the diameter. If a series of such holes be drilled in close proximity, and preferably of substantial peripheral contact with each other and in a row along the axis of the intended trench, as shown at 40ª, 40ᵇ, 40ᶜ, etc., in Figure 3, these adjoining holes will present a serrated formation of side walls instead of smooth and continuous side walls as desired. Furthermore, the material of these holes as cut away will be equal in amount to the volume of material to be removed from a continuous and smooth sided trench of desired width, the round holes having been drilled of such diameter that their combined cross-sectional areas is approximately equal to the cross-sectional area of the desired trench of the intended width.

Figure 3:
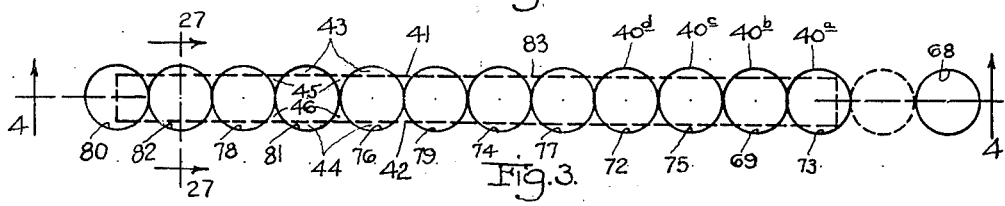
Figure 3 shows how the drilled holes shown in Figure 2 may be cut by a milling operation to produce the trench of finished approximately smooth form, but of reduced width as compared to the original diameters of the vertically drilled holes.

The above fact will be more readily apparent by consideration of Figure 3 wherein I have shown a series of the vertical and proximate holes, 40ª, 40ᵇ, 40ᶜ, etc., aligned along the trench axis, and in that figure I have also shown by the dotted lines 41 and 42 the smooth side-walls of the intended trench. The width of such trench is of course less than the diameter of the holes, or conversely, the holes are originally drilled to a diameter greater than the width of the intended trench, and in proper ratio. Examination of Figure 3 will also show that when these holes have been drilled in alignment as shown, there are produced serrated side-walls including the hole portions 43 and 44 lying outside of the confines of the intended trench, and also including the dirt portions 45 and 46 lying between contiguous holes, and within the confines of the intended trench. By proper proportioning of the hole diameter with respect to the intended trench width, the amount of material contained in the portions 43 and 44 will be equal to the amount of material contained in the portions 45 and 46, and this condition will be theoretically produced by making the hole diameter equal to the trench width divided by 0.7854. It is of course understood that the material contained in the round vertical holes themselves is removed from such holes and delivered above the ground surface. The correctness of the foregoing proportioning will be seen from examination of Figure 1 wherein the trench width is defined between the dotted lines 41 and 42, and wherein the lines 47 and 48 are placed tangent to the holes and normal to the axis of the intended trench. The area contained within the rectangle 41, 48, 42, 47, must be substantially equal to the area of the circle 40, and that condition is fulfilled by making the distance between the lines 41 and 42 equal to 0.7854 times the circle diameter. Of course the continuous trenching operation comprises forming the holes 40 substantially tangent to each other and along the axis of the intended trench, so that the completed trench will comprise a series of rectangles such as that shown in Figure 1, with their ends 48 and 47 in contact with each other along the trench.

Figure 4:
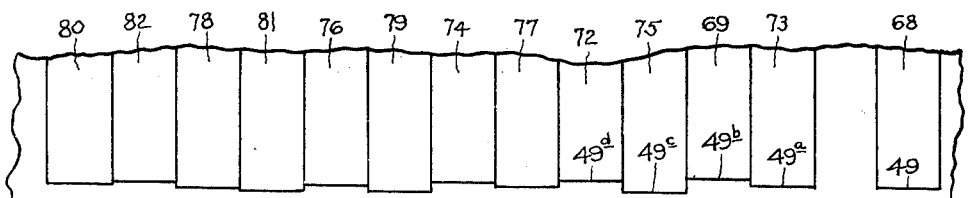
Figure 4 shows a vertical longitudinal section taken on the line 4—4 of Figure 3, looking in the direction of the arrows.

It is intended that the holes shall all be drilled to substantially the full depth of the intended trench, but due to practical operating conditions the bottoms of the consecutive holes will generally off-set slightly from each other as shown in Figure 4, such bottoms being shown by the lines 49, 49ª, 49ᵇ, 49ᶜ, etc.

After drilling the series of holes the treatment of the earth material to produce the smooth side-walled trench is effected by what may be called a horizontal miller, and I shall presently explain this operation in detail. At this point I shall first explain more in detail the process of drilling the consecutive holes or groups of holes in convenient manner, and in such manner that correct alignment is produced to ensure a completed trench of straight form, and also to prevent the cave-in of material into already drilled holes while drilling the adjacent and succeeding holes.

Referring to Figure 24 I have therein shown a template 50 having therein the holes 51 and 52 for reception of vertical drills of diameter to produce the desired vertical earth holes, and this template also carries plugs shown by the dotted circles 53 and 54 which "plugs" are of substantially the same diameter and length as the vertical holes so drilled in the earth, so that the plugs may completely fill such holes. These plugs are well shown in Figure 5 at 55 and 56 where they are suspended from the template 50 by the rods or the like 57 and 58 with the cross pieces connected to the upper ends of said rods. Sometimes holes will be made in the template 50 of small size as compared to the sizes of the plugs, and said holes will then be of size to pass the rods 57 and 58 so that the plugs will be freely suspended from the template, and by making the rods of loose size sufficient flexibility will be produced in the suspension of the plugs to permit said plugs to adjust themselves slightly as they are lowered into the previously drilled earth holes. When the template is afterwards raised the rods will draw the plugs up and out of the holes, and clear of the surface of the ground.

Figure 7:
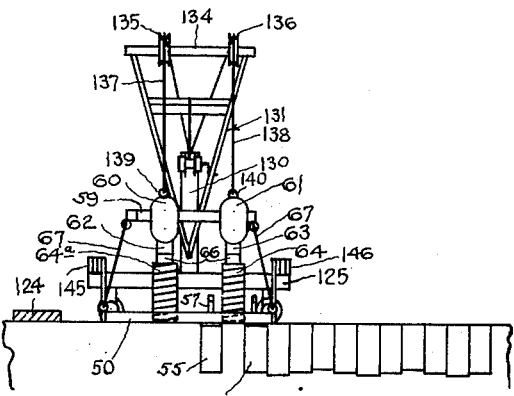
Figure 7 shows a view similar to that of Figure 5, but with the template lowered into engagement with the ground surface at the position for the next two holes to be drilled, and with the vertical drills at their positions at the beginning of such drilling operation.

Referring to Figure 25 I have therein shown a motor plate or bar 59 which carries the two vertical shaft motors 60 and 61. The shafts of these two motors are spaced at spacing equal to the spacing between the template holes 51 and 52, being, as I shall presently show, a distance equal to three earth hole diameters. Reference to Figure 7 will show that the lower portion or driven end of each motor shaft carries a fixture such as 62 (and 63 in Figures 5, 7, 9 and other figures), the fixture 62 being carried by the motor 60, and the fixture 63 being carried by the motor 61. These fixtures 62 and 63 may be provided with internally threaded axial holes, and the earth drill or other element to be driven may be connected into such threaded hole. Thus, in Figure 31 the earth drill or screw element 64 may have its shaft 65 provided with a top end fixture 66 which may be connected to the fixture 63 of the motor element, so that by supplying current to such motor element the earth drill 64 will be driven. Other elements to be driven by such motor, such as the horizontal miller, or the horizontal drill, both presently to be described, may be substituted in place of the earth drill element 64.

Figure 5:
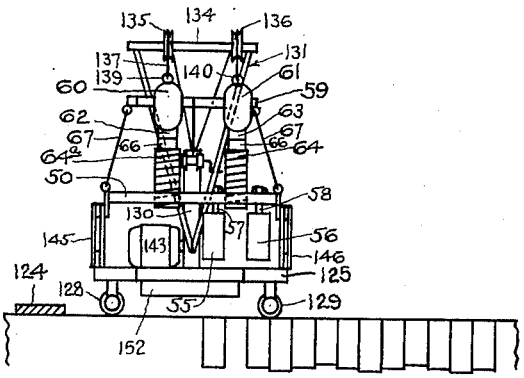
Figure 5 shows more or less schematically a side view of a trenching machine embodying the features of the present invention with one set or section of vertical holes drilled, and with the truck advanced into position to commence the drilling of further holes continuing such section of holes, the template and the drills being in raised position.
Figure 6:
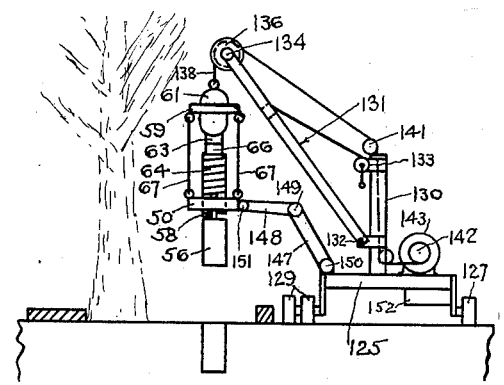
Figure 6 shows a right-hand end view corresponding to Figure 5.
Figure 8:
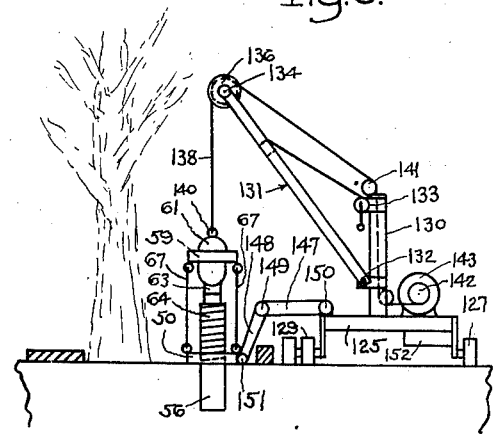
Figure 8 shows a right-hand end view corresponding to Figure 7.
Figure 9:
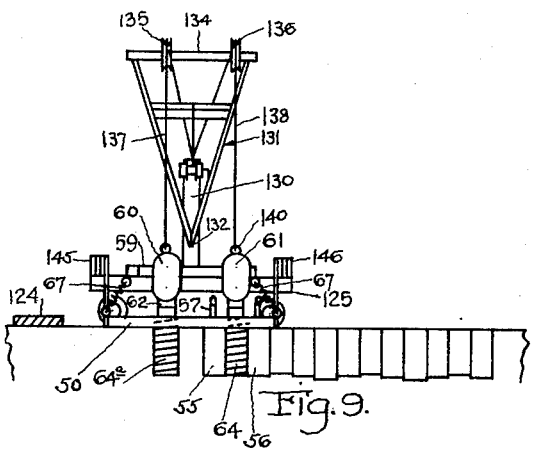
Figure 9 shows a view similar to those of Figures 5 and 7, but with the template still in contact with and supported by the ground surface, and with the vertical drills at their lowermost positions corresponding to completion of the drilling of the two new or fresh holes.
Figure 10:
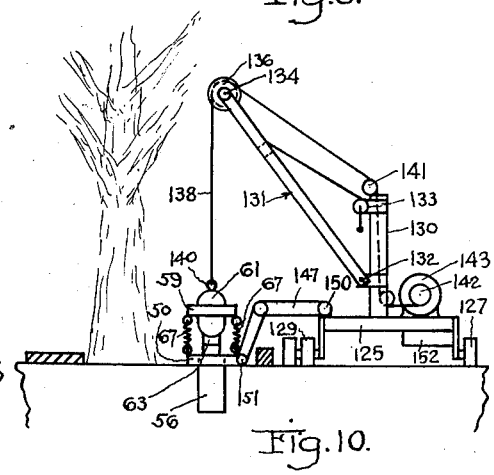
Figure 10 shows a right-hand end view corresponding to Figure 9.

In Figures 5 to 10, inclusive, I have shown the two motors as having the two earth drill elements 64 and 64a connected to them so that both of these earth drills may be driven simultaneously. Reference to Figures 5, 7 and 9 will also show that the plugs 55 and 56 are set into place in these figures. Conveniently the template 50 is carried from the motor plate or bar 59 by a series of flexible links or cables or cords 67 which are of such length that as the motor plate or bar is lowered the plugs 55 and 56 may remain suspended from the template (until they reach ground surface), while the earth drills or screws carried by the motor elements extend through the corresponding holes of the template, the motors and earth screws also lowering as the motor plate or bar 59, template 50, plugs, etc., are lowered. When the plugs have been sufficiently lowered they may move on down into registering previously drilled holes, thus causing the template and other parts to be locked against lateral displacement as long as the plugs remain in such holes. Also, the holes thus filled by the plugs will be protected against any inflow of earth material during the drilling of adjacent ground holes. The parts are so proportioned that when the plugs move down into previously drilled holes the template can continue to be lowered (by lowering of the motor plate or bar 59) until said template comes into contact with the ground surface, at which time it will of course be supported thereby. The parts are so proportioned that when the template comes into contact with the ground surface the plugs will have completely filled the hole or holes into which they have descended. This condition is shown in Figures 7, 8, 9 and 10, examination of which will also show that when the plugs have thus completely filled such ground holes said plugs maintain their registry with the template, so that the position of the template is fixed on the ground as long as the plugs remain in their respective ground holes.

Examination of Figures 7 and 8 will show that when the motor plate or bar has been lowered sufficiently to allow the plugs to fill the ground holes into which they have descended, and to just bring the template into ground contact, the motor plate or bar will still be at an elevation such that the earth drills or screws 64 and 64a have just come into contact with the ground surface. By then supplying the motors 60 and 61 with current and lowering the motor plate or bar 59 (the template remaining in contact with the ground surface), the cables or supports 67 will collapse as the motor plate or bar is lowered, and at the same time the earth screws will penetrate into the ground, drilling new holes vertically therein as long as such motor plate or bar continues to be lowered. Such continuous lowering may proceed until the new vertical holes have been drilled to a proper depth. Such depth is the desired depth of the trench to be produced.

During the drilling of such new holes as just referred to the template will remain accurately positioned by the engagement of the plugs with the holes into which they were inserted, so that the new holes will be accurately positioned during the entire drilling operation. Also, the plugs will prevent entrance of dirt into the holes which they occupy.

Figure 1:
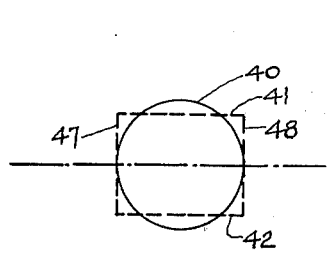
Figure 1 shows schematically how a round drilled hole of given cross-section may be transformed into a rectangular hole of like cross-section by transfer of material from the lateral portions of the "serrations" to fill the outward portions of said serrations.
Figure 2:
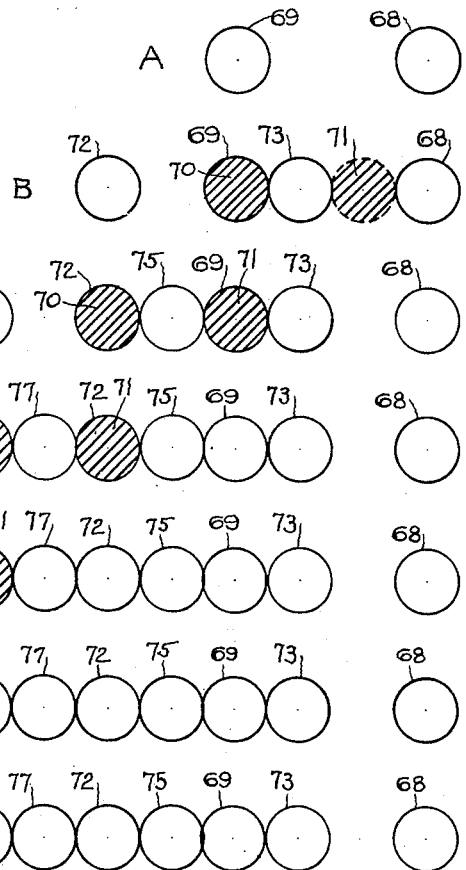
Figure 2 shows a series of seven steps in the production of a trench of given width by the use of vertically bored proximate holes, and it shows the successive steps of advancement of the apparatus during the successive drilling operations.

After completion of the two holes thus drilled, the motor plate may be again raised, thus raising the two motors and the two earth screws, and as soon as these latter have been raised substantially to clearance above the ground surface the flexible connections 67 will come into play, so that further raising of the motor plate will also raise the template, and the plugs will then rise therewith, and such continued raising may be continued until the plugs have been brought clear of the ground surface. Thereupon the entire apparatus may be advanced along the direction in which trenching is proceeding, to bring the plugs into registry with two other ground holes. The motor plate may then be lowered again, allowing the plugs to descend into these two new ground holes, such lowering continuing until the plugs have completely filled these two new holes, bringing the template again into contact with the ground surface, and then two new or additional holes may be drilled by use of the two motors and ground screws. Thus the process may be continued stage by stage along the desired alignment of the trench to be completed. I shall now explain further features in connection with the foregoing operations;

Referring first to Figure 2 I have therein shown the two ground holes 68 and 69 spaced from each other a distance equal to three hole diameters (between their centers). These two holes may be drilled by use of the two ground screws driven by the two motors, to commence a trenching operation. I have previously stated that the two motors and their shafts are thus spaced from each other a distance of three hole diameters. During such preliminary drilling operation the two plugs may be removed from the template, or if such template is provided with holes through which the plugs may rise, the plugs may rest on the ground surface during this preliminary operation, allowing the motor plate to move down until the proper depth of ground holes has been produced. These two original holes will thus be of correct diameter, and they will be spaced three hole diameters apart (center to center). This operation is designated as "A" in Figure 2.

The apparatus is now advanced a distance to the left (in Figure 2) equal to two hole diameters. This brings us to the position "B" in said figure. In this position one of the plugs, 70 may be allowed to descend into the hole 69, and the other plug, 71 may either be still removed from the apparatus or may be allowed to rise, resting on the ground surface as shown by the dotted circle 71 in Figure 2, it being understood that the two plugs are separated a distance equal to only two ground hole diameters instead of the three diameters at which said ground holes 68 and 69 were drilled. With the plug 70 thus located in the hole 69, and the template thus fixed in position, both of the motors may be again operated, allowing the motor plate to again move down, and the two additional holes 72 and 73 will be drilled. It is noted that during this operation the hole 73 is being drilled adjacent to the previously drilled hole 69, but the presence of the plug 70 in said hole 69 will prevent entry of material into said hole 69, and will also prevent breakthrough of the thin wall of earth material between such previous hole 69 and the new hole 73. It will be seen also that upon completion of this operation "B" there will be two holes 69 and 73 close together, as well as the original hole 68, and the additional new hole 72, this latter separated from the hole 69 by a space equal to a hole diameter.

Having completed the operation "B" the apparatus may be again advanced leftwards a distance equal to the diameter of two ground holes to the position "C." In this position both of the plugs may be allowed to enter holes, being the two holes 72 and 69, the plugs being shown at 70 and 71. With the template thus accurately positioned the new ground holes 74 and 75 may be drilled, it being again noted that the hole 75 is drilled between the two previously drilled holes 72 and 69, but that the new hole 74 is separated from the previously drilled hole 72 by a distance equal to one hole diameter. At completion of operation "C" the holes 73, 69, 75 and 72 are completed contiguous to each other and in trench alignment, the new hole 74 being separated one diameter from such trench hole section, and the hole 68 being disconnected from the holes just considered.

The apparatus may be again advanced a distance equal to two ground hole diameters, to the position of operation "D." Here the two new holes 76 and 77 are drilled, the plugs occupying the holes 74 and 72, and it will be noted that an amount of trench section holing has been added which is equal to two of the ground hole diameters.

Thereafter further advancements and operations may be conducted to the positions of operations "E" and "F," the additional holes 78, 79, 80 and 81 being added to the trenching. At completion of the operation "F" there will remain a blank space between the two holes 80 and 81, according to the principles of operation already explained.

Let it be assumed that the hole 80 comes at the end of the desired trench section, for example, close to a cross-walk. It is then desired to drill a hole between these two holes 80 and 81 so as to complete the operation to the end of the string. Such additional hole 82 may be drilled in the usual manner, the apparatus having been advanced to the position shown by the operation "G," and during the drilling of the operation "G" the left-hand ground screw may be disconnected from its motor element 60. Thus the terminal operation may be completed to bring the string of holes close to the desired terminal end of the trench. The hole 68, originally drilled may be abandoned or it may be connected to the string by a hand shovel operation if desired.

Upon completion of these several operations we shall have a string of holes as shown in Figures 3 and 4. It will now remain to perform the necessary additional operations to complete the trench proper, and also such supplemental operations as connection between two trench sections at opposite sides of an obstruction, such as a cross-walk, tree, pavement, or the like.

Referring to Figures 18, 19, 20 and 26 I have therein shown a horizontal "miller" designated in its entirety by the numeral 83. This miller is of a length equal to a number of ground hole diameters, for example, 12 or 20 diameters, and it is provided with longitudinally extending cutting edges or fins which will cut away the earth as the miller is rotated. Conveniently this miller includes the central shaft section 84, which carries two or three spaced rings or disks such as 85 and 86 (and 87) to which disks are secured as by spot welding the several longitudinally extending cutting edge elements, 88, 89, 90 and 91. These may comprise T or angle sections, with their bases connected to the rings and with their flanges extending outwardly as shown in Figures 27 and 28 to provide the cutting edge portions. Also, these cutting elements may be somewhat spiralled along the length of the miller, as shown.

At the right-hand end this miller carries a shaft section 92 which connects to a driving element as will be explained presently. However, in order to take care of slight bending or warping of the miller, due to its length and the lateral forces which are generated during the milling operation, I prefer to connect the right-hand end ring 87 and the shaft connection to the main shaft element 84 by means of a universal joint such as shown at 93 in Figures 20 and 26. This will ensure drive of not only the right-hand end ring 87 but also drive of the main shaft section 84 and the rings 85 and 86 carried thereby. The left hand end of this miller may be provided with a hanger support 94 comprising a short shaft section which may be introduced into a hole in the end ring element 85 and the left-hand end of the main shaft section 84, such support including an eyelet 95 to which may be connected a supporting cable or cord as will presently appear.

I have provided a gear box 96 of size which may move down into the trench which has been previously completed to correct width; and this gear box contains the bevel gears 97 and 98 as shown in Figure 26. The gear 97 is carried by a short vertical shaft section 99, and the gear 98 is connected to the shaft section 92 already referred to. When the ground screw has been disconnected from the drive element 63 of the motor 61 an element 100 may be connected to such drive element, so as to be driven thereby; and this element 100 is provided with a shaft socket to receive a hollow shaft section 101 having a number of holes 102, the shaft section 99 also being provided with at least one companion hole. By setting the shaft section 99 up into this hollow shaft element 101 and then passing a cross pin through registered holes, a driving connection is established between the motor unit and the bevel gear right-angular drive to the miller.

Conveniently the miller may be suspended by cables or cords passing from the eyelet 95 to an eyelet 103 carried by the motor plate 59, and passing from an eyelet 104 carried by the bevel gear box to an eyelet 105 also carried by the motor plate 59. Manifestly any suitable means of more or less flexible support of the miller in its horizontal position may be substituted for that shown, it being merely desirable that suitable support for the horizontal miller shall be provided during the milling operation. That milling operation is performed as follows:

Assuming that a section of vertical holes has been drilled as shown in Figures 18 and 19, the apparatus is moved back to the beginning end of such section, and the hole drilling screws are removed from the respective motor elements 60 and 61. Then the miller element is attached to the right-hand motor element as shown in Figure 26. With the apparatus in correct position the motor plate is lowered, the right-hand motor element 61 being supplied with current, and as the miller comes into contact with the ground surface and proceeds downwardly the cutter edges will cut away the ground material from the interstices 45 and 46 (see Figure 3) to bring the trench to the desired width, the removed material working endwise and filling the spaces 43 and 44 lying to the outside of the downward path of the miller. By continuing the milling operation downwardly substantially to the bottom of the desired trench such bottom will be given a smooth but rounded surface, and any irregularities as between successive vertical hole bottoms will be cut away, so that the completed trench will have a smooth and continuous bottom. In Figures 18 and 19 the trench section 106 has been completely milled, the section 107 is being milled, and the section 108 remains to be milled as the next operation.

Figure 11:
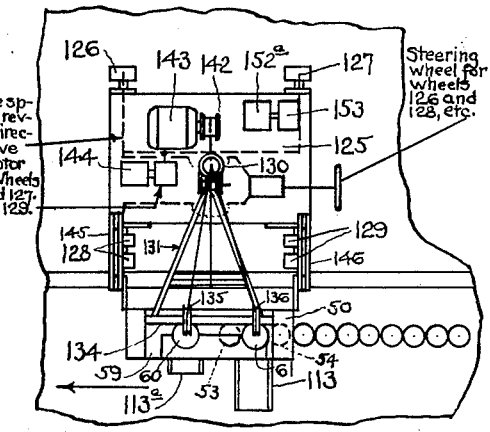
Figure 11 shows a horizontal plan view corresponding to Figures 5 to 10, inclusive.

Reference to Figures 31 and 32 will show how I cause the earth material which is removed from the vertical ground holes during drilling to be disposed of. Adjacent to each of the earth screws, and supported by the template 50 there is a chute, such as shown at 109. Such chute includes the side walls 110 and 111, the end wall 112, and the bottom is formed by the template 50 itself. The left-hand end is left open to provide a delivery opening for the removed earth material. The upper portions of the side walls and the upper portion of the end wall 112 are carried up high enough to control the rising material and ensure its delivery laterally through the opening at the left-hand side of the unit. I have also provided a short conveyor 113 working in that portion of the chute unit at the delivery side thereof, such conveyor being of length sufficient to ensure delivery of the delivered material far enough laterally to prevent return of such material into the drilled holes. The conveyors for the two delivery chutes or the two earth screws may be independently driven, as by small motors 114 carried by the template 50. As shown in Figure 11 the two conveyors may be of different lengths as shown at 113 and 113a so that the material rising from the two holes will be delivered at different distances laterally of the trench. Preferably the leading one of these two conveyors is the shorter and the trailing one is the longer as shown in Figure 11 wherein the arrow shows the direction in which the trenching operation is proceeding.

Reference to Figures 21, 22, 23, 29 and 30 will show the form of horizontal drill which I have provided for carrying an opening through considerable lengths of earth between two sections of trench, when discontinuity of trenching is imposed by such obstructions as cross-walks, trees, pavements, etc. This horizontal drill includes the shank element 114, the bevel gear box 96 such as has already been described, the connection of said bevel gear box to the drive element of the motor unit 61, and corresponding parts, already described in connection with the miller arrangement. In the present case, however, I have provided the universal joint element 115 as a special unit included in the shaft section 92 between the gear box and the shank 114 of the horizontal drill. This universal joint permits the shank of this horizontal drill to be inclined either upwardly or downwardly as needed to ensure correct formation of the earth hole to be drilled. The body of the shank may be supported by a suspending hook or the like, 116 depending from the eyelet 103 carried by the motor plate 59, and which has already been referred to. Preferably this suspending connection includes the tubular section 117 into which is telescoped the rod section 118, several cross holes being provided in one section as shown at 119, so that by insertion of a cross pin the elevation of the hook 116 (and therefore the inclination of the drill shank) may be adjusted to meet the requirements.

To the free end of this drill shank there is screw-connected the drill point or bit element 120, the threading being such that the torque imposed during drilling tends to tighten up the connection. After completion of drilling a hole beneath or through the obstruction, so that the bit has come through, said bit may be unthreaded from the shank, and another rope attaching tool 121 may be threaded onto the end of the shank so that when the shank is drawn back through the drilled hole the rope 122 will be drawn through such hole, and serve as a means for thereafter drawing the cable through the drilled hole. Conveniently both the drill bit and such rope attaching tool are provided with threaded ends which can be threaded into the end of the bore of the shank 114.

In Figure 29 I have shown by the broken line 123 how the hole may be drilled at an angle to the horizontal so as to give the desired connection to the trench sections at the two sides of the obstruction.

In Figures 21, 22, 29 and 30 the obstruction being drilled beneath is the cross-walk 124. I have also found that it is possible to use this equipment for drilling through such obstructions as tree roots, and other semi-hard materials which may lie in the path of the trenching operation. It is also possible to carry such horizontal drilling for considerable distances, as for example, forty or fifty feet beneath a pavement which is to be traversed.

I have now shown how the various operations incident to production of a complete trenching with connections between the several sections thereof, may be effected. Evidently the exact form of truck or other carrier for the various elements of such equipment is largely a matter of selection by the designer. However, I shall now describe the particular arrangement of such truck which I have chosen to illustrate in the present case. For this purpose reference may be had particularly to Figures 5 to 19, 21, 22 and 23. I have provided a small truck including the platform 125 having the supporting wheels 126 and 127 at the outside, and the double wheels 128 and 129 at the curb or working side. This platform carries the central mast or post 130 which is preferably rockable through ninety degrees of rock or more. This mast carries the boom 131 which is pivoted to the lower portion of the mast at the point 132 so that the boom can be raised and lowered through substantially 75 degrees of swing. Control of such up and down swing of the boom is effected by means of the winding drum 133 carried by the upper portion of the mast, together with suitable means to lock the drum in boom adjusted position.

The upper portion of this boom carries a cross bar 134 to which are journalled the two pulleys 135 and 136. Cables 137 and 138 are passed over these pulleys and connect to suitable eyelets 139 and 140 provided on the two motors elements so that by use of these cables the motor elements, and thus also the motor plate or bar 59, may be raised and lowered under control of these two cables. These two cables are preferably connected together and passed over a pulley 141 carried by the upper end of the mast, and then passed down through the mast to a drum 142 driven by a motor element 143 carried by the truck platform. By this means the motor plate or bar can be raised and lowered by control of the motor 143, and suitable locking means may be provided for holding the drum 142 in any adjusted position of the motor plate or bar 59.

It will be evident that with this arrangement the boom may be initially raised or lowered to position which will ensure the desired amount of overhang of the cross bar 134 so that said cross bar will occupy position directly above the location where the trenching is to be carried out. Thus, for example, the boom may be set for trenching just inside of the curb and within the parkway. Having thus adjusted the boom, the motor plate may be raised and lowered as required for successive drilling operations, the truck being advanced periodically along the pavement on which the truck is riding during these various operations. I have shown the small motor 144 carried by the truck, and which is connected to the truck supporting wheels or some of them, by driving connections (not shown) so that the truck may be advanced either continuously or intermittently by such motor drive 144 during the several operations.

The template is connected to the truck by means of the two elbow or arm connections 145 and 146. Each of these includes the two links 147 and 148 which are pivoted together at the point 149; and the free end of the link 147 is pivotally connected to the truck by means of a bracket 150, and the free end of the link 148 is pivotally connected to the template by means of the pivotal connection 151. These links are located at such positions, and so connected to the truck and to the template that said template can be either swung back onto the truck platform and supported thereby close to the base of the mast, or the template can be swung outwardly over the curb to such a distance as is limited by the lengths of the links. Also, it will be seen that this arrangement makes it possible to set the template flat on the ground adjacent to the curb, or at the desired distance from such curb, even though the ground surface is not smooth or is not in alignment with the curb or the pavement on which the truck is riding. Also, the adjustability of the boom makes it possible to bring the motor plate into exact vertical alignment with the template so that correct registry of the vertical earth screws with the template openings will be assured.

Figure 12:
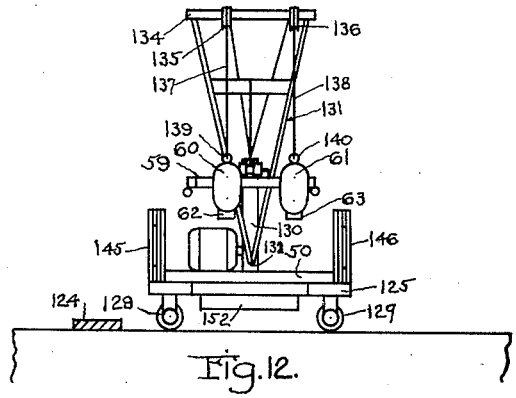
Figure 12 shows a side view corresponding to Figures 5, 7 and 9, but with the template disconnected from the vertical drill element and laid back onto the surface of the truck so that the drill or motor element may be used independently of said template element.
Figure 13:
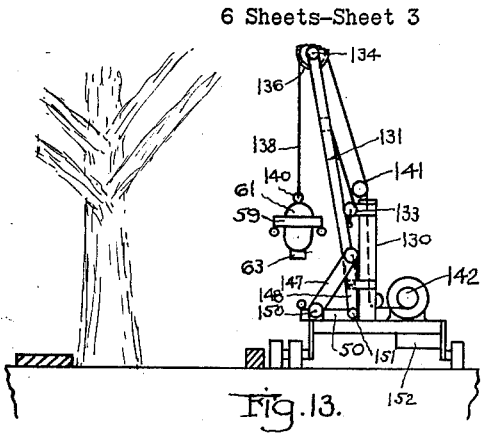
Figure 13 shows a right-hand end view corresponding to Figure 12.
Figure 14:
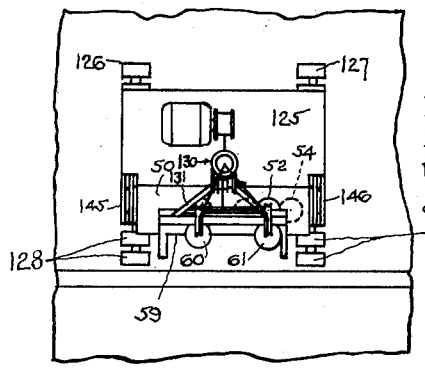
Figure 14 shows a horizontal plan view corresponding to Figures 12 and 13.
Figure 15:
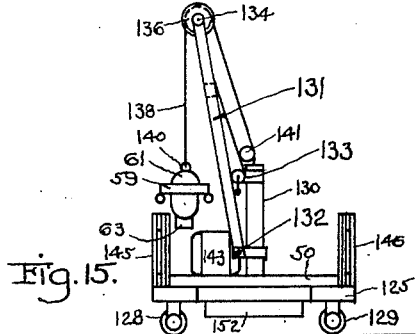
Figure 15 shows a side view similar to those of Figures 5, 7 and 9, and especially similar to that of Figure 12, but with the boom swung around through ninety degrees so that the truck element may be readily moved along a street to the desired trenching location.
Figure 16:
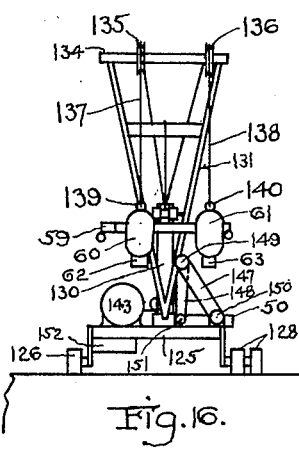
Figure 16 shows a left-hand end view corresponding to Figure 15.
Figure 17:
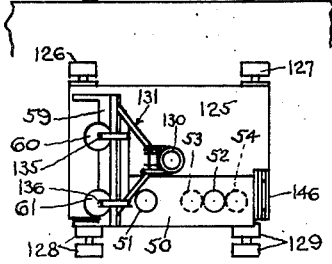
Figure 17 shows a horizontal plan view corresponding to Figures 15 and 16.

In Figures 12 and 13 I have shown how the template may be set back and onto the surface of the truck platform. With the template thus set back onto the truck the boom may also be raised to bring it close to the mast, thus also bringing the motor plate 59 close to the mast. With these parts in such position the boom may be allowed to remain in its position facing sidewise as shown in Figures 12, 13 and 14, or it may be swung around through ninety degrees to bring the boom towards the end of the truck, as shown in Figures 15, 16 and 17.

If desired a counterweight 152 may be provided at that side of the truck opposite to the normal working side of the same, so as to further ensure against overturning of the truck under loads imposed, especially when the boom is swung out to considerable distances beyond the side of the truck platform.

The distance between the centers of the two earth screws 64 and 64a is three times the diameter of said screws. The reason for this relationship will be evident from examination of the successive steps shown at "A" to "G" in Figure 2. Thus, by comparison of steps "C" and "D" it will be seen that in passing from the one step to the next the earth screw 64 must take its position behind the previously drilled vertical hole, and if the earth screws were separated by only twice the screw diameter an advancement of two hole diameters from step "C" to step "D" would bring the second screw (64) to the location previously drilled by the screw 64a. Manifestly this would not produce the desired drilling result; but by separating the screws three diameters the desired result is produced.

The driving connections between the motor 144 and all or some of the truck supporting wheels 126, 127, 128 and 129, may be such as to enable reversal of the truck drive so that said truck can be moved in either direction along the pavement or other supporting surface; and also provision may be made for controlling or varying the speed of movement of the truck. Also one or both pairs of the truck wheels, 126—128 and/or 127—129 may be articulated on vertical pivots for steering the truck, and the cross connection between such pair of wheels may be controlled for steering by means of a tongue, or by means of a suitable steering wheel, in the well understood manner.

Any suitable source of current may be used for supply of current to the motors 60, 61, 143, 144, etc.; thus for example, if suitable power lines are close at hand in the location where the trenching is to be done, such power lines may be tapped and current conducted to the truck by a suitable electric cable. Preferably, however, a small generator 152a is carried by the truck, driven by a small internal combustion engine, such as a gasoline engine 153, suitable switches, rheostats, and other elements and connections being provided for control of the power supply to the various motors, etc. The generator will of course be of size to meet the requirements of the trenching machine, for example, four kilowatts.

If desired the template elbow links or arms 147 and 148 or either of them (for each end of the template) may be made adjustable in length, as by making the same of a telescoping construction. In such case such arms would be of fixed length, of adjusted amount.

If desired the connections of the vertical earth drilling screws or the connections of the right-angular gear box shaft 99 to the motor element 61 may include torque limiting clutches 154 of sufficient torque transmitting ability to transmit all usually required amounts of torque but to slip in case of locking the driven element or unduly imposing a load thereon. For example, in case one of the vertical shaft earth drills or screws should encounter a rock or other obstruction which could not be penetrated, its torque limiting clutch could slip, thus allowing the motor element to continue its rotation without serious damage.

It is noted that the bevel gears 97 and 98 shown in Figure 26 are of equal pitch diameters so that both of the shafts 99 and 92 will rotate at the same speed. By making these bevel gears of different pitch diameters said shafts 99 and 92 will rotate at different speeds. Then, by setting the gear box into position with the shaft 99 connected to the motor element 61 and the shaft 92 connected to the miller element (as shown in Figure 26) or to the horizontal drill (as shown in Figure 29) such miller or horizontal drill will be driven at one speed ratio as compared to the motor element. Then, by disconnecting the gear box and said shafts, and by turning the gear box over and connecting the shaft 92 to the motor element 61 and the shaft 99 to the miller (or horizontal drill) such miller or drill will be driven at a different speed ratio as compared to the motor element which is driving the same.

If desired there may be provided the vertical tubular flanges 154$^a$ extending down from the template 50 at the locations of the two holes 51 and 52 through which the vertical earth screws 64$^a$ and 64 work. These flanges will set down onto the ground surface when the template is set into a new position, and will penetrate slightly into such ground surface around the locations at which the two new holes are to be drilled. Then, as such drilling proceeds downwardly the rising earth, rising through the screws, will be guided into the chutes and will be prevented from working sidewise between the template and the surface of the ground. As the drilling proceeds these flanges will settle down into the freshly drilled holes until finally the template comes to rest directly and flatly on the ground surface.

If desired a measuring wheel 155 may be provided on the truck or connected thereto, such wheel being so supported that its periphery rides on the surface of the pavement or other support. This measuring wheel may be made of such size that its periphery is equal to or is a multiple of the distance the truck must be advanced in passing between successive earth drilling stages, such as from "B" to "C," or from "C" to "D" (in Figure 2). This distance may be, for example, two feet. By providing this measuring wheel with a signal device such as a bell the operator will be informed when the wheel has completed a revolution, so he will be informed that the truck has moved to its next operating position.

Conveniently the motor elements or units 60 and 61 will be built with internally contained gear reducer, so that the rotary rates of the driven elements 62 and 63 (to which the vertical earth drills or screws, or the bevel gear drive for the horizontal miller or for the horizontal drill are connected) will be much reduced as compared to armature speeds of such motor units, and with corresponding increase of the delivered torques of such motor units.

While I have herein shown and described only a single embodiment of the features of my present invention, still I do not intend to limit myself, except as I may do so in the claims to follow:

I claim:

1. In a trench forming apparatus, the combination of a pair of vertical drills of substantially equal diameter, means to support said drills with their axes vertical and separated from each other a distance equal to three times the diameter of the drills, said supporting means being vertically movable, means to raise and permit lowering of said supporting means, a vertically movable horizontal templet, means to support said templet, said templet supporting means being vertically movable, there being a pair of drill guiding through openings in the templet in axial alignment with the drills, and of size to accommodate the drills and separated from each other center-to-center a distance equal to three times the drill diameter, the drills being vertically movable through said openings, another pair of plug guiding through openings in the templet of substantially the same size as the drill guiding openings, said plug guiding through openings being separated from each other center-to-center a distance equal to twice the drill diameter, both of said plug guiding through openings being formed in the templet at opposite sides of and in circumferential contact with one of the drill guiding through openings, and all of the drill guiding and plug guiding through openings being located with their centers in substantial alignment in the templet, a pair of vertically movable cylindrical plugs, means to support said plugs with their axes vertical and in alignment with the plug guiding through openings of the templet, and means to raise and permit lowering of said plugs through said templet openings, the plugs being of substantially the same diameter as the drills.

2. Means as specified in claim 1, together with means to move the drill supporting means, the templet supporting means, and the plug supporting means horizontally with said supporting means all retaining their respective relative positions unchanged in horizontal direction.

3. Means as specified in claim 2 wherein said moving means is effective to move said parts horizontally in a direction substantially parallel to the direction of the alignment of the through openings of the templet.

4. Means as specified in claim 1 wherein the drill supporting means is vertically movable through a predetermined distance and wherein the drills are vertically movable through a predetermined vertical drilling distance to drill holes to a bottom at a predetermined distance below the templet, and wherein the plugs have a vertical cylindrical dimension at least as great as the distance from the templet to the drilled hole bottoms.

HARRY H. BATES.

References Cited in the file of this patent

UNITED STATES PATENTS

| Number | Name | Date |
|---|---|---|
| Re. 20,131 | Reilly | Oct. 13, 1936 |
| 252,917 | Williams | Jan. 31, 1882 |
| 269,410 | Graham et al. | Dec. 19, 1882 |
| 404,852 | Long | June 11, 1889 |
| 532,679 | Mason | Jan. 15, 1895 |
| 574,660 | Carroll | Jan. 5, 1897 |
| 725,202 | Bates | Apr. 14, 1903 |
| 1,071,477 | Stowe | Aug. 26, 1913 |
| 1,179,750 | O'Rourke | Apr. 18, 1916 |
| 1,270,231 | Stauft | June 18, 1918 |
| 1,482,396 | Hansen | Feb. 5, 1924 |
| 1,507,776 | Humiston | Sept. 9, 1924 |
| 1,631,693 | Richey | June 7, 1927 |
| 1,632,946 | Brunig | June 21, 1927 |
| 1,698,529 | Bennett | Jan. 8, 1929 |
| 1,721,392 | Heumann | July 16, 1929 |
| 1,932,068 | Englebright et al. | Oct. 24, 1933 |
| 2,014,792 | Weimer | Sept. 17, 1935 |
| 2,308,067 | Eickhoff | Jan. 12, 1943 |

FOREIGN PATENTS

| Number | Country | Date |
|---|---|---|
| 178,840 | Canada | Aug. 21, 1917 |